April 15, 1969     H. SIMON     3,438,126
METHOD OF MANUFACTURING CABLES OF PREDETERMINED LENGTHS
Filed April 26, 1966
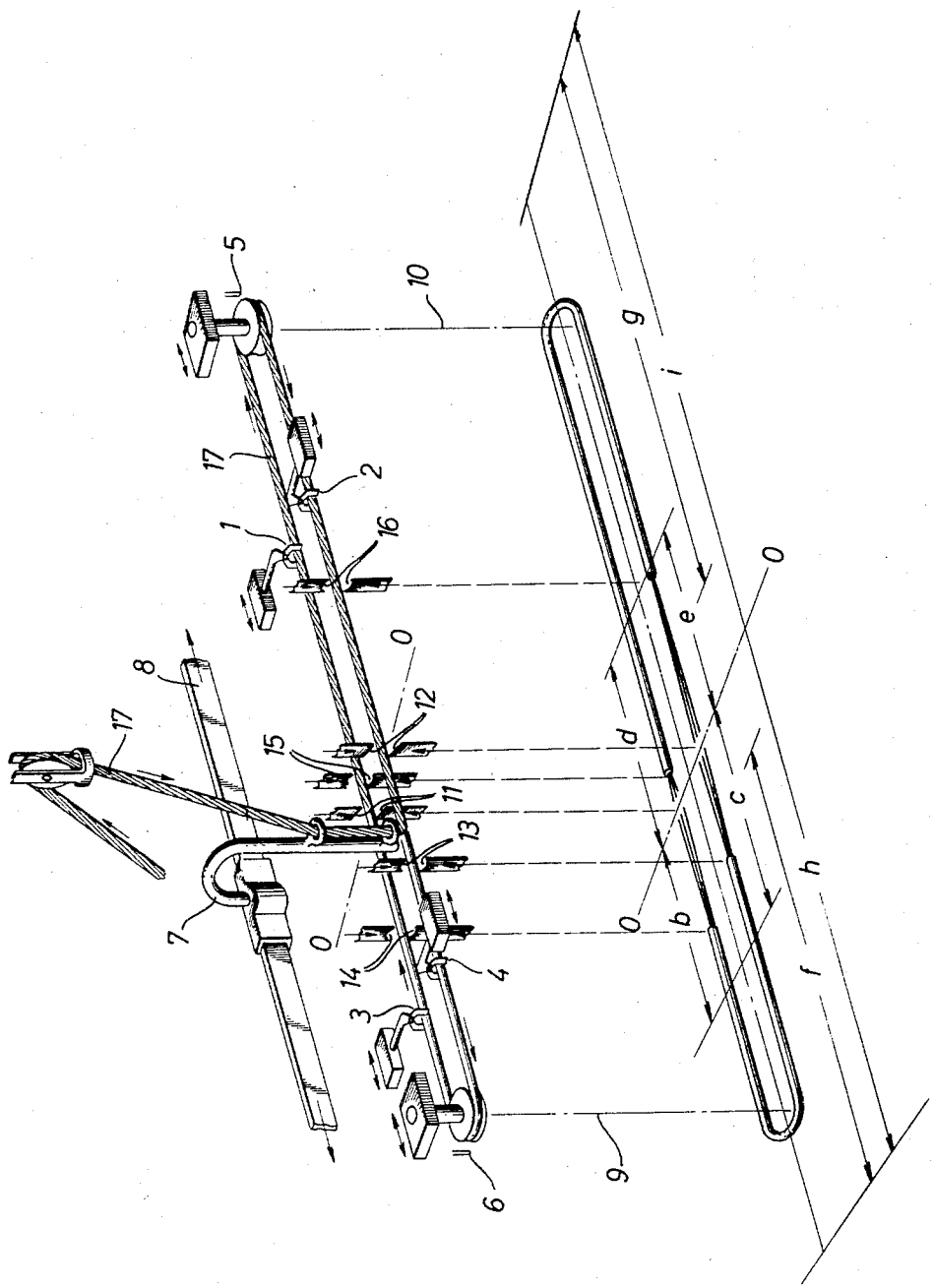
INVENTOR:
HANS SIMON
BY: Sternberg + Blake
Attorneys United States Patent Office 3,438,126
Patented Apr. 15, 1969

3,438,126
METHOD OF MANUFACTURING CABLES OF PREDETERMINED LENGTHS
Hans Simon, Bruchhausener Strasse, 5463 Unkel (Rhine), Germany
Filed Apr. 26, 1966, Ser. No. 545,361
Int. Cl. H01b 13/00
U.S. Cl. 29—624          10 Claims

ABSTRACT OF THE DISCLOSURE

A method of manufacturing cables of predetermined lengths. The cable is continuously laid out in a given direction along the closed path, and while held at a first part of the path the cable is cut through at a second part of the path which precedes the first part thereof. Then while the cable is held at a third part of the path subsequent to the first part thereof, the cable is again cut through at a fourth part of the path which precedes the third part thereof and is adjacent thereto, this fourth part of the path also being subsequent to the first part thereof. In this way the second cutting through of the cable at the fourth part of the path will form one cable length while when the continuously laid out cable again reaches the first part of the path and is again cut through at the second part thereof, a second cable length will be provided, and in this way during the continuous laying out of the cable along the closed path a pair of cable lengths are provided with the total length of these cable lengths being equal to the length of the closed path.

---

The present invention relates to a method of manufacturing cables of predetermined lengths.

In particular, the present invention relates to the manufacture of electrically conductive cables of predetermined lengths, these cables being insulated and having stripped ends.

One of the objects of the present invention is to provide a method capable of continuously manufacturing cables of predetermined lengths from a supply cable which is continuously withdrawn from a suitable source.

Another object of the present invention is to provide a method which makes it possible to strip both ends of a cable simultaneously.

Furthermore, it is an object of the invention to provide a method which makes it possible to achieve two sets of cables with all of the cables of one set having equal lengths which may be of the same length as or of a different length from the length of the cables of the second set.

Also, it is an object of the invention to provide a method which makes it possible to regulate the length of the stripped ends of the cables.

Furthermore, the objects of the present invention include a method which makes it possible to increase the output as compared to conventional methods for manufacturing cables of predetermined length, as well as to simplify the known methods and provide a method which requires an extremely small amount of wear on the parts used in the method of the invention while at the same time providing the possibility of achieving a large number of cables all of which have the same or different cross sections.

Up to the present time the known methods as practiced with known machinery simulate old hand methods according to which a predetermined length of cable is achieved in a stepwise manner by withdrawing the cable from a suitable source in given strokes of a predetermined length. After a certain number of strokes a given length of cable is achieved and then the cable is cut and stripped.

It is also known to derive a predetermined length of cable by feeding the cable through supply rollers which withdraw the cable from a suitable source, and according to this method the withdrawn cable is measured while it is transported so that when the required length of cable is achieved the cable can then be cut and stripped. With this latter type of method the stripping is also carried out in a manner simulating old, well-known hand operations. The disadvantage of the known methods resides in the fact that parts are required to be moved back and forth in predetermined strokes resulting in extremely high wear because the strokes are necessarily relatively short, and the cable of course moves in a stepwise manner. Because of limitations on the movements of the parts, the known methods are not capable of stripping the ends of a conductor to the desired extent. Furthermore, particular difficulties are encountered when relatively long cables are required.

It is, therefore, an object of the invention to provide a method which will avoid all of the above drawbacks.

According to the method of the present invention the supply cable, which is withdrawn from any suitable source, is continuously laid out in a given direction along a closed path. This path may have an elongated configuration and the mable may extend around a pair of rollers which are situated at the ends of the path and which may have the distance therebetween adjusted so as to regulate the length of the closed path. The cable is continuously laid out in a direction extending from one roller to the other and then back to the first roller, along the closed path. After the cable has been laid out at a first part of the closed path, it is held at this first part of the path and then the cable is cut through at a second part of the path which is adjacent the first part thereof but which precedes the first part in the direction of laying out of the cable along the closed path, so that in this way one cable end is formed. Thereafter the cable is held at a third part of the path which follows the first part in the given direction of laying out of the cable, and following the holding of the cable at the third part of the path the cable is cut through at a fourth part of the path which precedes the third part thereof but which follows the first part of the path in the direction of laying out of the cable along the closed path. This second cutting through of the cable will provide one cable length extending from the second to the fourth part of the path in the direction of the laying out of the cable, and the cable is released at the first part of the path so that in this way a first cable length is achieved. As the cable is continuously laid out it will again reach the first part of the path where it will again be held. Of course, the previous cutting through of the cable at the fourth part of the path has formed not only the second end of the first cable but also the first end of the second cable, and when the cable is again cut through at the second part of the path the second cable is completed, after which the cable is released at the third part of the path, so that a second cable length is achieved in this way. These steps are continuously repeated in the above sequence, according to the invention, so that a set of first cables and a set of second cables are continuously manufactured with the length of each first cable when added to the length of each second cable equalling the length of the closed path.

The cable is preferably an insulated electrical conductor, and when it is initially held at the first part of the path the insulation is cut through simultaneously at this first part of the path. The insulation is also cut through at a fifth part of the path prior to the cutting through of the cable at the fourth part of the path and this fifth part of the path precedes the fourth part in the direction of laying out of the cable along the closed path. After cutting through the insulation at the fifth part of the path the first cable is pulled, subsequent to cutting through at the fourth part of the path, away from the second and fourth parts of the path, so that the insulation is held between the first and fifth parts of the path and the second and fourth parts thereof, respectively, thus stripping the ends of the cable as it is pulled away from the second and fourth parts of the path, and in this way the first cable will have stripped ends. By providing for adjustable locations of the first and fifth parts of the path, it is possible to control the length of the stripped end portions.

In the same way when the cable is held at the third part of the path the insulation thereof is simultaneously cut through and the insulation is also cut through at a sixth part of the path which precedes the second part thereof in the direction of laying out of the cable, whereupon, after cutting through at the second part of the path the second cable is pulled away from the second and fourth parts of the path while the insulation is held at the third and sixth parts of the path, thus providing the second cable with stripped ends whose lengths can be regulated by adjusting the locations of the third and sixth parts along the closed path.

In this way it is possible to use simple cutting units for cutting through the cable as well as to provide an exceedingly compact arrangement of the tools which, in the case where both sets of cables are approximately of the same length, will all be located substantially centrally providing an exceedingly convenient and simple operation. Furthermore, because of the ease of adjustability of the various locations of the various parts of the path referred to above, it is possible to provide the most varied cable lengths and lengths of stripped cable ends with an exceedingly inexpensive structure and method.

The method of the present invention also makes it exceedingly simple to provide automatic controls. Thus, for example, it is possible to provide in cooperation with the guide rollers at the ends of the path actuating switches capable of being actuated by the cable itself or by the structure which lays the cable out, so that in this way the various units, such as cutters, strippers, grippers, and the like, can be set into operation in a predetermined sequence which will provide an automatic carrying out of the method of the present invention.

While individual operating units or tools of the type referred to above are known in and of themselves, so that they do not form part of the present invention, their particular arrangement and sequence of operation so as to carry out the method of the invention is part of the present invention.

The invention is illustrated by way of example in the accompanying drawing in which the method of the present invention is schematically illustrated, the method being illustrated during laying out of an insulated electrical conductor along a closed path, and the drawing shows projected beneath the cable which is being laid out a pair of finished cable lengths having stripped ends and derived from the endless cable loop which is continuously laid out along the closed path in the manner described below.

Referring to the drawing, a supply cable 17, which may be an insulated electrical conductor, is withdrawn continuously in the direction of the arrows shown at the upper part of the drawing from any suitable supply roll and is guided through eyes carried by a guide arm 7 which is supported by a reciprocating bar 8 which forms part of a known and therefore only schematically illustrated structure. A pair of guide rollers have their axes coinciding with the axes 9 and 10 and the cable is laid out around these axes 9 and 10 on the guide rollers situated at these axes, so that the cable is continuously laid out along a closed path in the form of an elongated loop whose length is determined by the distance between the axes 9 and 10. In the method illustrated in the drawing the cable 17 is laid out from left to right toward the axis 10, passes around the axis 10 and then is laid out from right to left from the axis 10 toward the axis 9 after which the cable passes around the axis 9 and then continues toward the axis 10, so that in this way the cable is continuously laid out in a closed path and in a given direction along this closed path. The guide rollers which engage the cable at the axes 9 and 10 are supported for free rotary movement in any suitable bearings which can have their positions adjusted so as to adjust the distance of the axes 9 and 10 from a predetermined line O—O situated between the axes 9 and 10. The lengths of the cables will be determined by the distance of the turning axes 9 and 10 from the line O—O plus one half the circumference of each roller. A pair of cutting untis 11 and 12 are positioned for cutting through the cable at the line O—O while known stripping units 13–16 are situated along the closed path laterally displaced but adjacent the line O—O. The stripping unit 15 is of a known structure having, for example, notched blades capable of cutting through the insulation and engaging the wire surrounded thereby so as to simultaneously hold the cable. The stripping unit 13 also acts to hold the cable as well as to cut through the insulation thereof. The units 14 and 16 operate only as stripping units and do not have a holding function. It is to be noted that the stripping units 15 and 16 are situated on one side of the line O—O while the units 13 and 14 are situated on the other side of the line O—O. These stripping units are also capable of having their distances, respectively, from the line O—O adjusted, so that in this way the lengths of the stripped cable ends can be adjusted. Referring to the lower part of the drawing, the dimensions $b$, $c$, $d$ and $e$ designate the maximum range of adjustment of the stripping units from the line O—O. The range of adjustment of the axes 9 and 10 is designated by the dimensions $f$ and $g$.

The supply cable 17 is initially placed in the open cutting unit 11 and holding and stripping unit 15, while the cable is laid out along the path progressing toward the axis 10. The holding and stripping unit 15 is located at a first part of the path where the cable is initially held, and then the cable is cut through by the unit 11 at a second part of the path, so that in this way one cable end is formed, and this cable end is illustrated in the drawing. Thus, while the cable has a free end at the second part of the path where the cutting unit 11 is located, the cable is held by the unit 15 which has simultaneously cut through the insulation. The cable is continuously laid out, passing around the axis 10 and then through the open stripping unit 16, the open cutter 12, the open holding and stripping unit 13, and around the axis 9. It is to be noted that the second part of the path where the cable is cut through by the cutting unit 11 precedes the first part of the path where the holding unit 15 is located, in the direction of laying out the cable along the closed path. The holding and stripping unit 13 is located at a third part of the path, and the cable is held at this third part of the path by the holding and stripping unit 13 after the cable has reached this third part of the path. Then, according to the method of the invention, the cable is cut through at a fourth part of the path where the cutting unit 12 is located, and this fourth part of the path precedes the third part, where the holding unit 13 is located, in the direction of laying out of the cable, but this fourth part of the path follows the first part thereof where the holding unit 15 is located. Thus, when the cable is cut through by the cutting unit 12 it is held by the unit 13 as it is continuously laid out with the cable approaching the axis 9 to pass about the latter through the open stripping unit 14 and back to the cutting unit 11. The cutting through of the cable at the fourth part of the path where the unit 12 is located has formed a first cable length extending from the line O—O somewhat beyond the axis 10. While the holding unit 15 can be actuated to release this first cable after it is cut through at the fourth part of the path where the cutting unit 12 is located, in order to derive an electrical cable with the insulation stripped from the ends thereof, the stripping unit 16 is actuated to cut through the insulation, and then a pair of cable grippers 1 and 2 are actuated to grip this first cable and displace it to the right, as viewed in the drawing, so as to pull the cable away from the line O—O where the second and fourth parts of the path are located, and during this pulling of the cable the stripping units 15 and 16 remain in engagement with the insulation so that the insulation is stripped along cable lengths extending from the units 15 and 16 to the cutting units 11 and 12, respectively. As soon as the cable is pulled beyond the units 15 and 16 the gripping units 1 and 2 drop the cable onto a suitable receiver which may simply be a hook onto which a number of cables will be received, these cables being supported at their curved ends previously situated at the end of the closed path of the loop-shaped configuration.

All of the above units may be electrically actuated, and for this purpose either the guide arm 7 or the cable itself may engage a switch 6 adjacent the axis 9 for initiating the operation of the grippers 1 and 2. Thus, these grippers operate while the cable is continuously laid out along the path at the portion thereof extending from the switch 6 toward the cutting unit 11. An automatic control releases the gripping units 1 and 2 when they have moved through a predetermined increment, and simultaneously the units 15 and 16 as well as the cutters 11 and 12 are opened, through the electrical controls, so that by the time the cable again reaches the unit 11 the cutter will have its blades spread apart to receive the new length of cable as it is being continuously laid out, and the unit 15 is also open to receive the new length of cable.

As the cable passes around the axis 10, either the cable itself or the guide 7 actuates a switch 5 which operates in a manner similar to the switch 6 so as to actuate a pair of grippers 3 and 4 which displace the second cable to the left, as viewed in the drawing, away from the line O—O. The actuation of the switch 5 closes the holding unit 15 on the cable and causes the cutter 11 to cut therethrough just prior to displacement of the left cable away from the line O—O by the grippers 3 and 4. Thus, as the cable is laid out from the axis 10 toward line O—O where the cutting unit 12 is located, the left cable is pulled away from the line O—O. The switch 5 actuates not only the units 3 and 4 but also the stripping unit 14, and the holder 13 remains in its position engaging the insulation, so that in this way the second cable has its insulation stripped along its end portions which extend from the units 13 and 14 to the cutting units 12 and 11, respectively. After the units 3 and 4 have displaced the second cable through a distance sufficient to strip the ends thereof, these units 3 and 4 are automatically deenergized so as to drop the cable and at this time the unit 13 is simultaneously opened together with the units 12 and 14, so that the cable can now pass through the space between the blades of the cutter 12 and the blades of the holding and stripping unit 13. The stripping unit 16 was opened after the gripping units 1 and 2 were displaced to the right, as viewed in the drawing, through a distance sufficient to strip the ends of the right cable.

Thus, the actuation of the switch 5 brings about holding of the cable at the first part of the path where the unit 15 is located, with simultaneous cutting through of the insulation of the cable, cutting through of the cable at the second part of the path where the cutting unit 11 is located, actuation of the stripping unit 14, and displacement of the left cable by the units 3 and 4 away from the line O—O so as to strip the ends of the cable, the unit 13 remaining closed at this time. The end of the movement of the grippers 3 and 4 to the left, as viewed in the drawing, serve not only to place these grippers in a releasing position but also to open the unit 13 and the unit 14 while the following actuation of the switch 6 closes the unit 13 onto the cable, cutting through the insulation thereof and holding the cable at the third part of the path where the unit 13 is located, whereupon the cable is cut through at the fourth part of the path where the cutting unit 12 is located and at the same time the stripping unit 16 is actuated to cut through the insulation so that during the following actuation of the gripping units 1 and 2 the right cable will be stripped.

In this way the above sequence of operations is continuously carried out continuously providing two sets of cables with the cables of each set having the same length and the same stripped ends and with the length of any one cable of one set when added to the length of any one cable of the second set providing a total length which is equal to the length of the closed path along which the cable is laid out.

The grippers 1 and 2 return to their initial position while the cable is laid out around the axis 10, and the cable is laid out around the axis 9 while the units 3 and 4 return to their initial position.

The dropped cable length can be supported at their intermediate portions on suitable hooks or the like onto which the cables drop, and any suitable conveyors can convey the cables away to a desired location, and in addition the cables can be automatically counted and bundled in any desired groups and in synchronism with the dropping of the cables so that a continuous operation is achieved. Any suitable conveyors may be actuated in response to movement of the units 1 and 2, on the one hand, and 3 and 4, on the other hand.

The entire adjusting range of the machine to either side of the line O—O is indicated at $h$ and $i$.

Thus, with the exceedingly simple method of the invention it is possible to achieve an extremely high output in a highly reliable manner.

What is claimed is:

1. In a method of manufacturing cables of predetermined lengths, respectively, the steps of continuously laying out a cable in a given direction along a closed path, holding the cable at a first part of said path, cutting through the cable at a second part of said path which is adjacent said first part and which precedes said first part in said given direction, so as to form a cable end, then holding the cable at a third part of said path subsequent to said first part in said given direction, cutting through the cable at a fourth part of said path which precedes said third part and is adjacent said third part, but which follows said first part of said path in said given direction, releasing the cable at said first part of said path, so as to provide a first cable whose length is a fraction of the length of said path, again holding the cable at said first part of said path after the laid out cable again reaches said first part of said path, again cutting through the cable at said second part of said path to provide a second cable whose length is equal to the difference between the length of said path and the length of said first cable, releasing the second cable at said third part of said path before the laid out cable again reaches the third part of said path, and so on to continuously provide two sets of cables with a cable of one set having a length which when added to the length of a cable of the second set will equal the length of said path.

2. In a method as recited in claim 1, said cable being in an insulated electrical conductor, and stripping ends of said first cable after cutting through the cable at said fourth part of said path, and also stripping ends of said second cable after cutting through the cable at said first part of said path.

3. In a method as recited in claim 1, receiving the sets of cables in devices for counting and binding the cables in predetermined groups.

4. In a method as recited in claim 1, and wherein the cable is an insulated electrical conductor, the step of cutting through the insulation of the cable at said first part of said path simultaneously with the holding of the cable at said first part, and after cutting through the cable at said fourth part of said path pulling said first cable away from said second part of said pth to strip an end of the first cable extending from said first to said second part of said path, said first cable being released at said first part of said path when the end formed at said second part of said path is pulled beyond said first part of said path.

5. In a method as recited in claim 4, the insulation of said supply cable also being cut through at said third part of said path simultaneously with the holding of said cable at said third part of said path, and pulling the second cable away from said second part of said path to strip an insulation extending between said third and fourth parts of said path so as to provide said second cable with a stripped end, said second cable being released at said third part of said path when the end formed at said fourth part of said path moves beyond said third part of said path.

6. In a method as recited in claim 4, cutting through the insulation of the first cable at a fifth part of said path which precedes said fourth part but follow said first part in said given direction, said fifth part being located adjacent said fourth part, and pulling the first cable away from said second and fourth parts of said path while the insulation thereof is held at said first and fifth parts thereof, so as to provide the first cable with a pair of stripped ends.

7. In a method as recited in claim 6, cutting through the insulation of the cable at said third part of said path simultaneously with the holding of the cable, and also cutting through the insulation of the cable at a sixth part of the path which follows said third part thereof but precedes said second part thereof, and then while holding the insulation at said third and sixth parts of said path pulling the second cable away from said second and fourth parts of said path to provide the second cable with stripped ends.

8. In a method as recited in claim 7, the step of laying out the cable along a closed path which is of an elongated configuration and which has a pair of opposed ends, and locating said second part of said path at distances from said ends which are the same as the distances of said fourth part of said path from said ends.

9. In a method as recited in claim 8, said second and fourth parts of said path both being situated midway between said ends so that said first set of cables and said second set of cables all have a length equal to one half the length of said closed path.

10. In a method as recited in claim 8, initiating the pulling of said second cable away from said second and fourth parts of said path when the laid out cable reaches the end of said path at which said first cable is laid out, and initiating the pulling of said first cable away from said second and fourth parts of said path when the laid out cable reaches the end of said path at which said second cable is located.

References Cited

UNITED STATES PATENTS

| | | | |
|---|---|---|---|
| 324,981 | 8/1885 | Cabot | 29—412 X |
| 470,763 | 3/1892 | Lowe | 29—417 |
| 2,623,550 | 12/1952 | Artoni | 29—412 X |
| 2,636,408 | 4/1953 | Mitchell | 29—426 |
| 2,708,968 | 5/1955 | Soave | 83—39 |
| 3,145,462 | 8/1964 | Bognar | 29—417 |
| 3,176,385 | 4/1965 | Morgan et al. | 29—417 |

FOREIGN PATENTS 1,084,799　7/1960　Germany.

CHARLIE T. MOON, *Primary Examiner.*

U.S. Cl. X.R.

29—412; 83—39, 924